J. L. EBLEN & H. KIRKENDALL.
BRACKET FOR VEHICLE LAMPS.
APPLICATION FILED MAR. 27, 1909.
924,045.
Patented June 8, 1909.
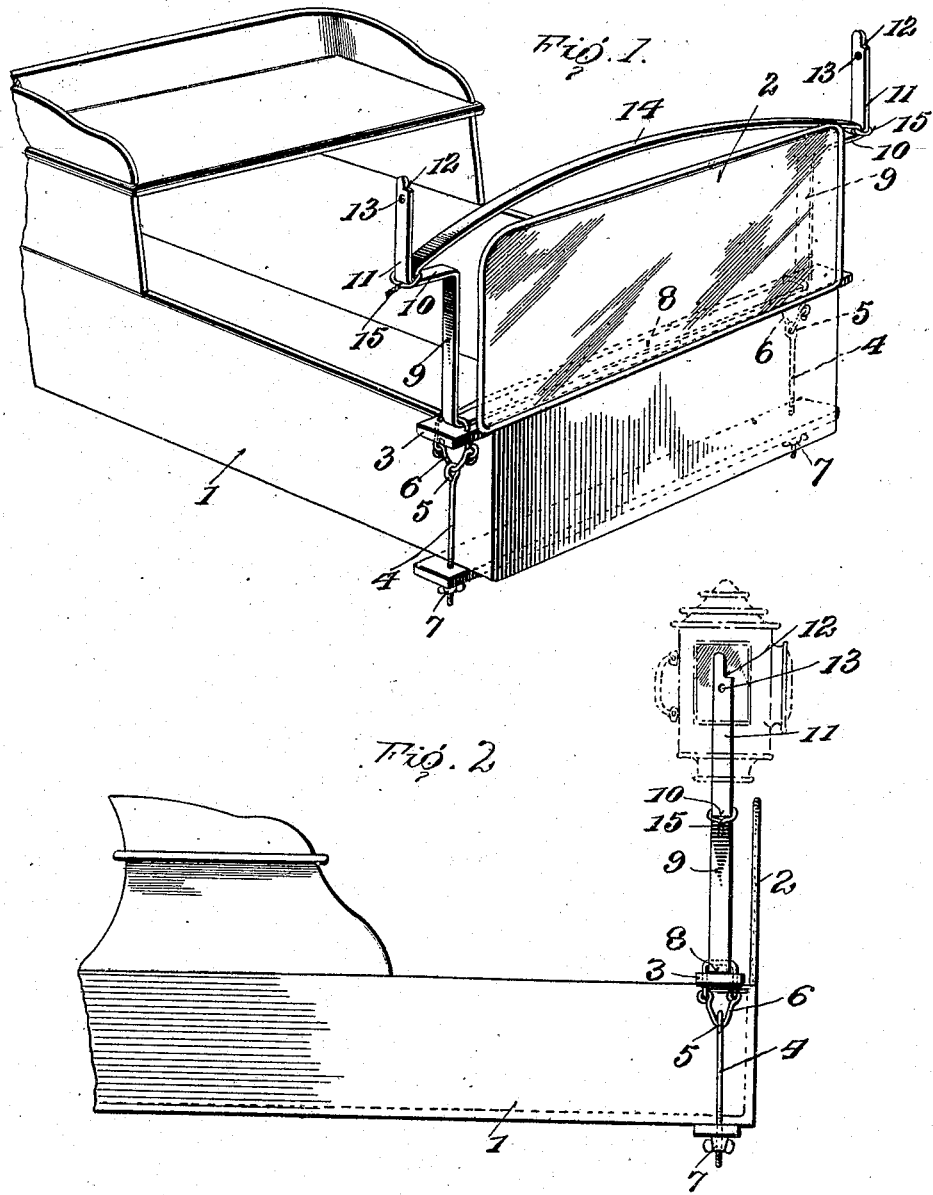

UNITED STATES PATENT OFFICE.

JOSEPH L. EBLEN, OF ALTON, AND HALLEY KIRKENDALL, OF BIRCH TREE, MISSOURI.

BRACKET FOR VEHICLE-LAMPS.

No. 924,045.  Specification of Letters Patent.  Patented June 8, 1909.

Application filed March 27, 1909. Serial No. 486,287.

*To all whom it may concern:*

Be it known that we, JOSEPH L. EBLEN and HALLEY KIRKENDALL, citizens of the United States, residing at Alton, in the county of Oregon and State of Missouri, and Birch Tree, Shannon county, Missouri, have invented certain new and useful Improvements in Brackets for Vehicle-Lamps, of which the following is a specification.

Our invention relates to brackets for vehicle lamps and it has for its object the production of a device to support lamps upon a vehicle in such position thereon as will reduce the jar and shocks on the lamps due to the movements of the vehicle on which they are mounted.

A further object of our invention is the construction of a lamp bracket which can be readily attached to or detached from a vehicle body and which is comparatively inexpensive in cost of construction, durable and efficient in performing the purpose for which it is designed.

With the foregoing and other objects in view the invention consists in the various details of construction and combination of parts hereinafter described and pointed out in the subjoined claims.

Referring to the drawings Figure 1 is a perspective view of the front end of a vehicle showing the lamp supporting bracket applied thereto, and Fig. 2 is a side elevation of a vehicle and the bracket with a lamp supported thereon shown in dotted lines.

1 designates the body of a vehicle and 2 the dash thereof.

3 is a narrow board which is placed immediately behind the dash-board and rests on the sides of the body of the vehicle and is of sufficient length to extend beyond such sides.

4, 4 are hangers or eye bolts having the eyes 5, 5 at their upper ends and being screw-threaded at their lower ends for the purpose to be presently described. The eye bolts at the upper ends of the hangers 4, 4 engage a strap 6 which embraces the board 3 and the lower ends of said hangers pass through the lower board 3′ and are provided on their lower or screw-threaded ends with wing-nuts 7, 7.

Secured to the upper board 3 is a bracket body preferably made from flat steel and having the flat bottom portion 8 of a length greater than the width of the body of the vehicle to which the device is intended to be attached and terminating at its ends in the upwardly extending portions 9 which are bent outwardly at 10 forming an offset and then extend upwardly to form the lamp supporting arms 11 which are provided near their ends with a slight offset or shoulder 12 and a hole 13.

The standards 11 are adapted to enter slots provided in the side of the lamp casing and may be firmly held in place by a set screw inserted through the hole 13.

Connected at its ends to the side arms of the bracket is a flat spring connecting brace 14 which extends over the body of the vehicle near the front thereof. The ends of this brace are connected to the bracket by the loops 15 at about the base of the standards 10 and the brace serves as a yielding or resilient connection between the said standards.

When it is desired to place our improved bracket in position on a vehicle the board 3 is placed in position just behind the dash thereof and the bolts or links are then passed through the bottom board 3′ and the wing nuts 7 are then secured on the threaded ends of said bolts and tightened up sufficiently to clamp the body of the vehicle between the two boards 3 and 3′. It will be obvious that the tension between these boards may be increased or diminished by turning the wing-nuts 7.

By reason of the resilient connection between the side lamp-carrying arms the shock on the lamps, due to the jolting and vibration of the vehicle on which they are mounted is greatly lessened and the jolting communicated but indirectly to the lamps, whereby they are saved from breakage and their usefulness prolonged.

Having described our invention what we claim as new and desire to secure by Letters Patent is—

1. A bracket for vehicle lamps comprising two members one of which is adapted to be placed over the body of a vehicle and the other beneath the same, means adjustably connecting said members whereby the body of the vehicle may be clamped between them, lamp supporting standards carried by the upper one of said members, and resilient means connecting said standards.

2. A bracket for vehicle lamps, comprising a member adapted to extend over the body of a vehicle, a second member extending beneath the same, adjustable means connecting the two members, a U-shaped member having its lower portion secured to the member which extends over the body of the vehicle and provided with vertical extensions and with right angle off set portions and terminating at its upper ends in straight vertical portions adapted to support a lamp, and a resilient member connecting said lamp-supporting portions as set forth.

In testimony whereof we affix our signatures in presence of two witnesses.

JOSEPH L. EBLEN.
HALLEY KIRKENDALL.

Witnesses:
　GEORGE W. BAILEY,
　NOAH BELL.